United States Patent [19]

Hlavacek et al.

[11] Patent Number: 5,147,552
[45] Date of Patent: Sep. 15, 1992

[54] METHOD OF AND APPARATUS FOR CLEANING FILTERS IN TANGENTIAL MICROFILTRATION

[75] Inventors: Marc Hlavacek, Coogee South, Australia; John Dodds, Nancy; Jean-Michel Bauer, Pagny sur Moselle, both of France

[73] Assignee: Le Carbone Lorraine, Courbevoie, France

[21] Appl. No.: 735,894

[22] Filed: Jul. 25, 1991

[30] Foreign Application Priority Data

Jul. 30, 1990 [FR] France .................. 90 09927

[51] Int. Cl.⁵ .............................................. B01D 61/00
[52] U.S. Cl. ...................... 210/650; 210/636; 210/409; 210/106; 210/111; 210/134; 210/195.2
[58] Field of Search ........... 210/650, 768, 106, 109, 210/111, 117, 321.69, 321.72, 87, 89, 636, 409, 88, 790, 195.1, 195.2, 134

[56] References Cited

U.S. PATENT DOCUMENTS

| | | | |
|---|---|---|---|
| 3,819,513 | 6/1974 | Ishii et al. | 210/636 |
| 4,581,236 | 4/1986 | Baudel et al. | 210/650 |
| 4,618,431 | 10/1986 | Hindman et al. | 210/111 |
| 4,678,477 | 7/1987 | Zhe et al. | 210/650 |
| 4,921,610 | 5/1990 | Ford et al. | 210/636 |

FOREIGN PATENT DOCUMENTS

0163406 9/1983 Japan .................. 210/650

*Primary Examiner*—Robert A. Dawson
*Assistant Examiner*—Ana Fortuna
*Attorney, Agent, or Firm*—Dennison, Meserole, Pollack & Scheiner

[57] ABSTRACT

A method of and an apparatus for tangential filtration with filter cleaning in which a fluid to be filtered forms a liquid loop and circulates tangentially to one surface of a membrane at a pressure Ph in which a filtrate flows from the other surface of the membrane through a pipe, provided with a flow meter and a first valve, to a tank at atmospheric pressure Pa, filtration taking place by virtue of a positive transmembranal pressure Ph - Pa. In the filtration phase, the hydrodynamic pressure Ph is adjusted by means of a second regulable valve. During the filter cleaning phase the first valve is closed and at the same time the second valve is slightly opened, the second valve is suddenly opened, the first valve is opened and the second valve is progressively closed. The method and apparatus in particularly suited to the filtration of corrosive liquids.

13 Claims, 2 Drawing Sheets

METHOD OF AND APPARATUS FOR CLEANING FILTERS IN TANGENTIAL MICROFILTRATION

FIELD OF THE INVENTION

The invention relates to a method of and an apparatus for cleaning filters in tangential microfiltration and applicable more particularly to the filtration of corrosive fluids.

REMINDER OF THE PRIOR ART

There are numerous documents available which list the problems connected with filtration, particularly the cleaning of the filter membranes, and they propose methods of cleaning these filters.

For example, French Patent No. 2586202 describes an apparatus and a method of cleaning filters in tangential filtration which provides means of periodically and automatically reversing the pressure at the level of the membrane (transmembranal pressure) so that filtrate passes through the membrane in the opposite direction and cleans the membrane.

Similarly, French Patent No. 2265437 describes an ultra-filtration plant which comprises means of carrying out automatic and periodic back washing, that is to say a means of causing a liquid to pass through the membrane in the opposite direction to the direction of filtrate passage.

Generally speaking, filter cleaning is carried out by reversing pressures and causing filtered or some other washing liquid to pass in the opposite direction through the ultra-filtering membrane.

STATEMENT OF THE PROBLEM AND OBJECT OF THE INVENTION

Having to filter corrosive fluids, the Applicants encountered difficulties transposing the known methods of filter cleaning to the tangential filtration of corrosive fluids, these difficulties being particularly connected with problems of corrosion.

In theory, filter cleaning methods which function with non-corrosive liquids ought also to function with corrosive liquids; in practice, the Applicants found that it was difficult and/or expensive to transpose the methods from one case to the other on account of the corrosion of the pumps, non-return valves, through valves, tanks, circuits and various items of equipment used, which do not always stand up sufficiently well to corrosion and which, when they do, are therefore very expensive.

The Applicants therefore sought a filter cleaning method which would resolve this problem.

A first object of the invention is a method of and an apparatus for tangential filtration with filter cleaning functioning in a corrosive medium without additional equipment specifically intended for filter cleaning, in order to limit the cost of the installation and that of renewing equipment on account of corrosion.

Furthermore, the Applicants observe that in the prior art methods which involve a reversal of transmembranal pressure, particularly if it is repeated frequently, this constitutes a mechanical stress on the membrane which is not favourable to its effective life and which may even lead to the membrane becoming detached from its support.

Therefore, a second object of the invention is a method of and an apparatus for filter cleaning without reversal of the transmembranal pressure in order to deal gently with the membrane and enhance its effective life.

The prior art generally employs filter cleaning with a back washing process. Back washing or back flush during the filter cleaning phase resides in passing filtrate or a washing solution over a membrane in the direction opposite to the direction in which the filtrate passes through during the filtration phase so that according to the method more or less substantial quantities of fluids pass through the membrane in the opposite direction to the direction of filtration.

A third object of the invention is a method of and an apparatus for filtration with filter cleaning which does not have recourse to back flush. Indeed, although generally effective and very widely used, back flush often calls for particular and expensive equipment to reverse the pressure at the level of the membrane and above all it either returns to the upstream circuit (circuit of the liquid to be filtered) filtrate from the downstream circuit which is not favourable to productivity or it returns to the upstream circuit a washing liquid which is different from the filtrate which is even more unfavourable than the previous possibility at productivity level since it takes time to make the substitution "filtrate→washing liquid→filtrate", without mentioning the problems of drainage and blending between fluids.

Therefore, the Applicants sought a method of and an apparatus for tangential filtration which meets these three objectives

DESCRIPTION OF THE DRAWINGS

FIG. 1 describes the installation used for the tests.

FIG. 2 indicates the fluctuation in rate of flow of filtrate during the course of time and shows the filtration-filter cleaning cycles.

FIG. 3 indicates the fluctuations in hydrodynamic pressure Ph and transmembranal pressure Pt during the course of one complete filtration-filter cleaning cycle.

DESCRIPTION OF THE INVENTION

Figure 1:
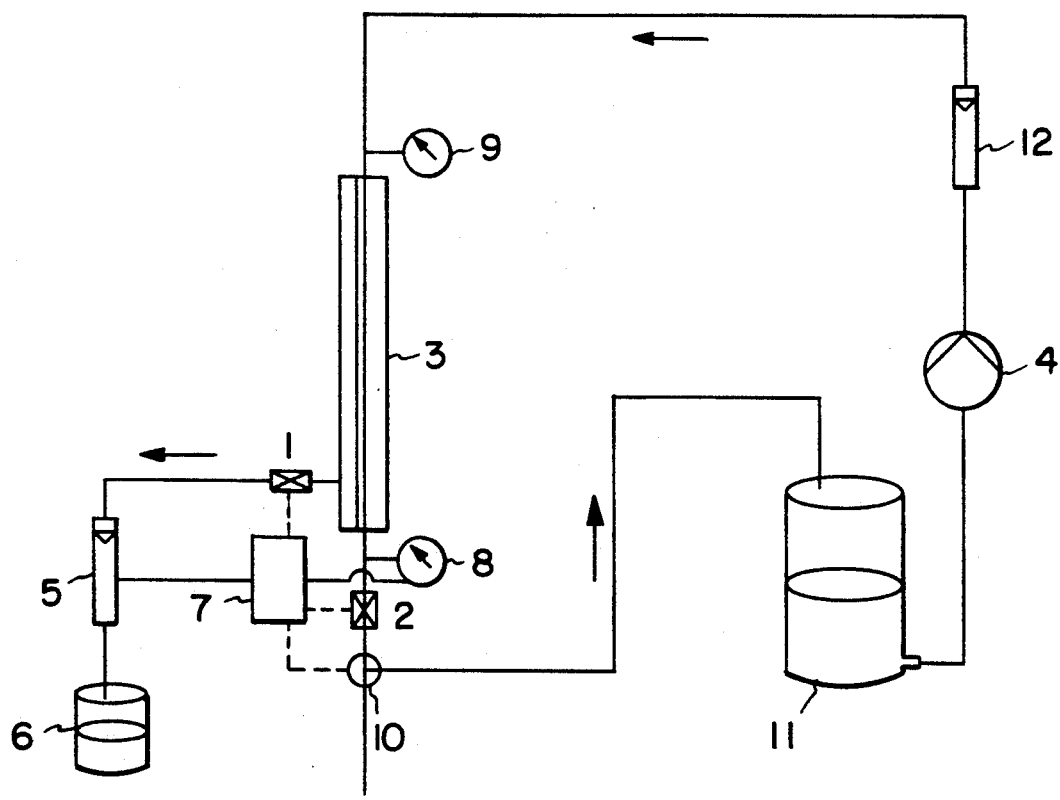
FIGS. 1 to 3 relate to the example cited and they illustrate the invention typically without however constituting the only possible embodiment thereof.

According to the invention, the method of tangential filtration with filter cleaning and in which a fluid to be filtered forms a liquid loop and circulates tangentially to a surface of a membrane (3) by means of a pump (4) situated upstream of the membrane which creates a hydrodynamic pressure Ph at the level of the membrane, in which a filtrate flows onto the other surface of the membrane through a duct fitted with a valve (1) and a flow meter (5) as far as a tank at atmospheric pressure Pa, in which filtration takes place thanks to a positive transmembranal pressure (Ph-Pa), is characterised in that during the filtration phase, the hydrodynamic pressure Ph is adjusted by means of a regulable valve (2) situated on the liquid loop downstream of the membrane,
during the filter cleaning phase,
 a) the valve (1) is closed in order to cancel out the flow and the transmembranal pressure and at the same time the valve (2) is open slightly in order to maintain the hydrodynamic pressure Ph substantially constant,
 b) the valve (2) is opened suddenly in order to cause an abrupt drop in hydrodynamic pressure Ph,
 c) the valve (1) is opened and the valve (2) is closed progressively in order to restore the initial high hydrodynamic pressure and transmembranal pressure at the onset of the filtration stage.

In accordance with a preferred embodiment of the invention, the pressure downstream of the valve (2) is substantially equal to the atmospheric pressure to within the losses of head.

The level of the hydrodynamic pressure Ph depends on the membranes and is not specific to the invention. Generally, it is comprised between 0.1 and 1 MPa.

According to a preferred embodiment of the invention, the valves (1) and (2) are electrically operated regulable valves. These two electrically operated valves are preferably controlled and operated on a timed basis: when the rate of flow of filtrate reduces and reaches a preset level Dc an actuating device (7) triggers the sequence of the three stages which constitute the filter cleaning phase:

a) closure of the electrically operated valve (1) with triggering of the electrically operated valve (2) at the hydrodynamic pressure Ph which is maintained constant (the electrically operated valve (2) opens to compensate for the increase in tangential flow). The duration of this stage is not critical and is generally comprised between 1 and 10 seconds;

b) sudden opening of the electrically operated valve (2) in the shortest possible time, in practice generally comprised between one-tenth of a second and one second. The pressure Ph drops to a level which is substantially that of atmospheric pressure, to within losses of head due to the piping. Simultaneously with the opening of the electrically operated valve (2), the electrically operated valve (10) may be opened to collect the residue which is rich in sludge from the filter cleaning process. The total duration of this stage will generally vary from a few seconds to a few tens of seconds for those suspensions which have the greatest tendency to clogging;;

c) opening of the electrically operated valve (1) and progressive closure of the electrically operated valve (2) over about 20 seconds.

All in all, the filter cleaning phase lasts less than one minute.

The invention resides essentially in this particular method of filter cleaning which combines a sudden drop in pressure Ph with a substantially nil rate of flux and transmembranal pressure.

Figure 3:
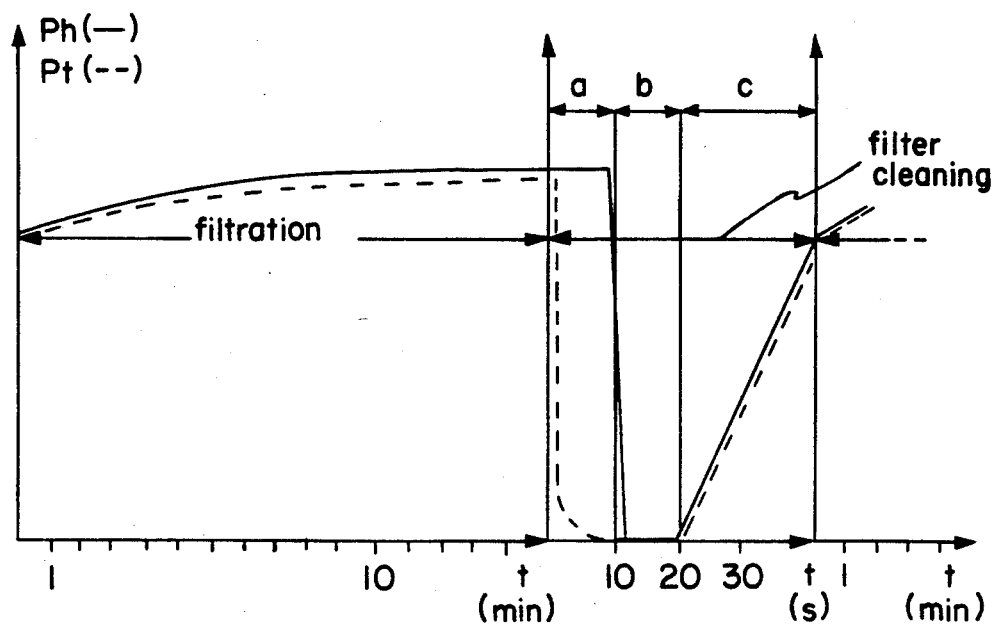

The invention will be more clearly understood from examination of FIG. 3 which shows the hydrodynamic pressure Ph and the transmembranal pressure Pt during one complete filtration and filter cleaning cycle (Ph is shown by the solid line and Pt by the dotted line).

It is worthwhile noting that Ph is a relative pressure so that when the valve (1) is open, whether this is during the filtration or stage c) of filter cleaning, the situation is substantially Ph=Pt. On the other hand, as soon as the valve (1) is closed, Pt becomes nil, the pressures being balanced out on either side of the membrane without any significant transmembranal flux, the liquids not being readily compressible. Physical filter cleaning, which occurs essentially during stage b) of the filter cleaning process, therefore takes place at zero pressure and transmembranal flux. In stage c), the pressures at the onset of the filtration cycle are restored by opening the valve (1) and progressively closing the valve (2).

It has been observed that if during stage a) of filter cleaning the valve (1) was closed first before the valve (2) was opened to a greater degree, the hydrodynamic pressure had a tendency to rise and it was found that this was not favourable for filter cleaning doubtless on account of the greater degree of compaction of the filter cake.

Similarly, if the valve (2) is opened before the valve (1) is closed, the hydrodynamic pressure Ph drops and it has been found that this did not permit of filter cleaning, either.

It was also observed that the effectiveness of the filter cleaning was linked to the speed of opening of the valve (2) in stage b). It is at this stage that the membrane is cleaned. One hypothesis suggested by the Applicants is that the filter cleaning is perhaps brought about by the propagation of disturbance due to the sudden fluctuation in pressure Ph (at least equal to 0.05 MPa/s and preferably more than 0.1 MPa/s), rather than by the increase in flux and the tangential velocity arising from closure of the valve (1).

Finally, it is likewise important for the valve (2) to be closed progressively in stage c) on pain of rapidly clogging the membrane again, the rate of pressure rise having to be less than 0.1 MPa/s and preferably less than 0.01 MPa/s.

During stage b), it is possible to open the valve (10) in order to recover the residue charged with solid particles from the clogging stage, and to limit the enrichment with solid particles of the suspension which is to be filtered. The valve (10) can be closed before the end of stage c).

Therefore, filter cleaning in accordance with the invention requires the respecting of various conditions relating to the opening/closing speeds, proper scheduling of successive/simultaneous actions so that although filter cleaning according to the invention may be carried out manually and with ordinary valves, it is nevertheless desirable to put the invention into practice with the help of electrically operated valves and automatic control devices of which the various parameters can be fixed, for example by programming. These devices receive data (level of rate of flow (5), hydrodynamic pressure Ph at the output from the membrane measured by the pressure gauge (8) are the minimum informations required by the device (7)) and execute orders (controlled opening/closing of valves 1, 2 and 10).

Figure 2:
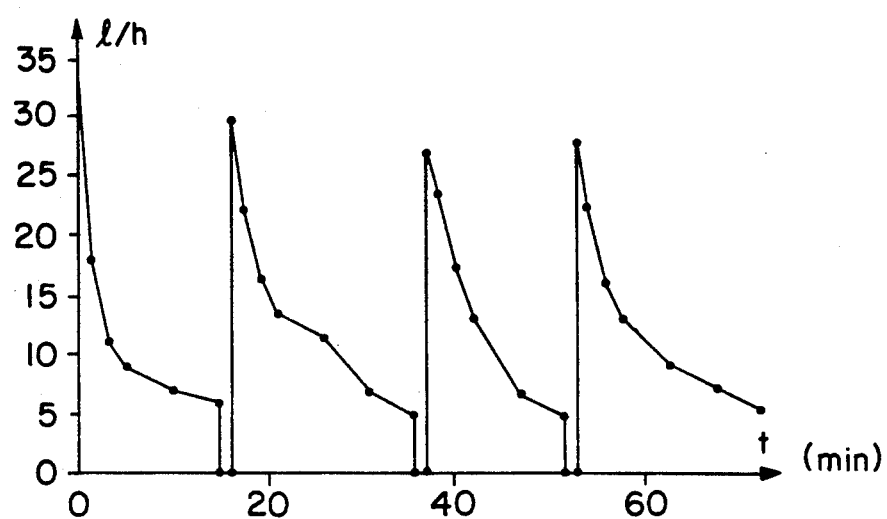

The example which follows and the associated FIGS. 1, 2, 3 make it possible to illustrate and to understand more clearly the method and the apparatus according to the invention:

The apparatus according to the invention, shown diagrammatically in FIG. 1 and used in the following example comprises:

a circuit upstream of the membrane (3), forming a loop in which the dispersion liquid to be filtered circulates constantly, comprising a tank (11) at atmospheric pressure containing the dispersion to be filtered (tests with a suspension of kaolinite at the rate of 0.5 to 5 g/l according to the tests, with a mean particulate size of 0.8 μm), a flow metering pump, a flow meter 12, a tangential filtration module with a membrane (3) having a filtering surface area equal to 0.02 sq.m, provided with a pressure gauge (8) measuring the pressure Ph just at the outlet from the filtration module and possibly a pressure gauge (9) measuring the pressure upstream of the module, a two-way electrically operated valve (2) in the liquid loop downstream of the filtration module, finally a three-way electrically operated valve (10) which makes it possible to evacuate the residue from the circuit when necessary, the circuit closing by the tank (11) being restored to atmospheric pressure, downstream of the membrane, a pipe for drawing off filtrate and equipped with an electrically operated valve (1), a flow meter (5), discharging onto a tank (6) at atmospheric pressure, a timing, regulating and monitoring device (7) which makes it possible to control the state of the electrically operated valves (1), (2) and (10) according to the rate of flow of filtrate and the hydrodynamic pressure Ph at the outlet from the filtration module, in accordance with the desired timing conditions.

A test was conducted for eight hours with a 1 g/l kaolinite dispersion.

Initially, the valves (1) and (2) are open and the valve (10) is closed. The flow metering pump (4) is started and its rate of flow is adjusted to 720 l/h. The tangential velocity at the intake to the membrane is 2.4 m/s and it remains constant through the entire test.

The valve (2) is regulated until the hydrodynamic pressure Ph attains the value of 0.14 MPa (relative pressure), and this pressure Ph, having regard to the fact that the other side of the membrane is substantially at atmospheric pressure, is close to the transmembranal pressure at the end of the membrane. The rate of flow of filtrate is then 30 l/h.

This rate of flow falls fairly rapidly as illustrated in FIG. 2 since at the end of 16 mins. this rate of flow is 6 l/h while the pressure Ph has risen to 0.15 MPa.

When this rate of flow is attained, the filter cleaning phase is started:

a) in approx. one second, the valve (1) is closed while the valve (2) is slightly opened in order to maintain the pressure Ph substantially constant. At the end of ten seconds, b) in 0.5 seconds the valve (2) is opened. At the same time, the valve (10) has been opened in order to recover the residue which is rich in filter cleaning sludge. At the end of ten seconds, c) the valve (1) is opened and in 20 seconds the valve (2) is closed again progressively until the initial pressure Ph is restored and the valve (10) is then closed. Then the cycle recommences regularly every 16 minutes approx. as shown in FIG. 2 for the fluctuations in rate of flow of filtrate, and in FIG. 3 for fluctuations in the pressure Ph and Pt, and this over eight hours without any departure from the method.

The various tests conducted at various kaolinite concentrations revealed no differences between the tests.

Therefore, without knowing the precise reasons, the Applicants found that it was possible to clean a membrane without reversing the transmembranal pressure and therefore without causing filtrate from downstream of the membrane to flow back towards the upstream side of the membrane.

Furthermore, the equipment in contact with the liquid flow (pump, flow meter, valves) is in practice only that needed for the filtration itself, so that the invention is advantageous and economic at the investment and associated operating cost level (upkeep . . . ) and is more particularly applied to the filtration of corrosive fluids where the cost of the equipment and its maintenance is generally very high.

We claim:

1. A method for tangential filtration of solids from a liquid with filter cleaning, comprising the steps of:

a) circulating a liquid to be filtered in a liquid loop from a liquid source, tangentially across one surface of a membrane serving as a filter in a filtration module, and through a regulable filtration valve located in said loop downstream of said membrane, said circulating taking place via a pump located in said loop upstream of said membrane, and creating a hydrodynamic pressure Ph at said one surface of said membrane;

b) setting said hydrodynamic pressure to a predetermined value by adjustment of said filtration valve;

c) filtering said liquid by passing a portion of said liquid through said membrane to form a filtrate, and passing said filtrate through a conduit including a regulable filtrate valve to a receptacle at substantially atmospheric pressure Pa, said filtering taking place via a positive transmembranal pressure;

d) cleaning said membrane by:
   1) closing said filtrate valve to stop flow of liquid through said membrane and simultaneously opening said filtration valve an amount sufficient to maintain said hydrodynamic pressure at said predetermined value; and
   2) suddenly opening said filtration valve an amount sufficient to cause an abrupt drop in said hydrodynamic pressure, thereby dislodging solids from said membrane into said loop; and e) restoring filtering by opening said filtrate valve and closing said filtration valve progressively, in order to create desired hydrodynamic and transmembranal pressure.

2. A method according to claim 1 in which the hydrodynamic pressure Ph has a value between 0.1 and 1 MPa during said filtering and said cleaning.

3. A method according to claim 1 in which, in the filter cleaning phase (b), the hydrodynamic pressure Ph drops to a pressure which is substantially equal to atmospheric pressure.

4. A method according to claim 1 in which said suddenly opening causes a drop of hydrodynamic pressure Ph at a rate at least equal to 0.05 MPa/s.

5. A method according to claim 4 in which the rate of drop is greater than 0.1 MPa/s.

6. A method according to claim 5 in which the rate of increase is less than 0.01 MPa/s.

7. A method according to claim 1 in which said restoring causes an increase in hydrodynamic pressure Ph at a rate less than 0.1 MPa/s.

8. The method according to claim 1 wherein the liquid being filtered is corrosive.

9. A method according to claim 1 additionally comprising measuring the flow rate of said filtrate and initiating said cleaning at a predetermined flow rate.

10. A method according to claim 9, wherein said filtration and filtrate valves are electrically regulable and are operated by an automatic control means.

11. A method according to claim 1 wherein said dislodged solids are removed from said loop.

12. An apparatus for tangential filtration of solids from a liquid, with filter cleaning, comprising:

a) a filtration module having a membrane therein serving as a filter, a tangential inlet and tangential outlet adjacent one surface of said membrane and a filtrate outlet adjacent the opposite surface of said membrane;

b) a loop for supplying a liquid to be filtered, comprising a supply tank, a first conduit connected between said supply tank and said filtration module inlet so as to deliver liquid tangentially to said one surface of said membrane, and a second conduit connected between said filtering module outlet and said supply tank;
c) a pump disposed in said first conduit;
d) a flow-meter disposed in said first conduit between said pump and said filtration module;
e) a pressure gauge disposed in said second conduit at the outlet of said filtration module;
f) an electrically regulable filtration valve disposed in said second conduit between said pressure gauge and said supply tank;
g) a three-way electrically operated valve disposed in said second conduit between said filtration valve and said supply tank, said three-way valve having an inlet disposed toward said filtration valve, an outlet disposed toward said supply means and a further outlet connected to a residue collection means; and
h) a filtration outlet circuit comprising a filtrate tank at atmospheric pressure, a filtrate conduit connecting said filtrate tank to said filtrate outlet, an electrically regulable filtrate valve disposed in said filtrate conduit and a flow meter disposed in said filtrate conduit between said filtrate valve and said filtrate tank.

13. An apparatus according to claim 12 wherein the filtration module, membrane, loop for supply of liquid and filtrate outlet circuits are fabricated of corrosion resistant materials.

* * * * *